(No Model.) 2 Sheets—Sheet 1.

J. C. LLOYD.
PLANTER.

No. 407,021. Patented July 16, 1889.

Witnesses
M. Fowler
E. L. Biggins

Inventor
James C. Lloyd
By his Attorneys (No Model.) 2 Sheets—Sheet 2.
J. C. LLOYD.
PLANTER.
No. 407,021. Patented July 16, 1889.
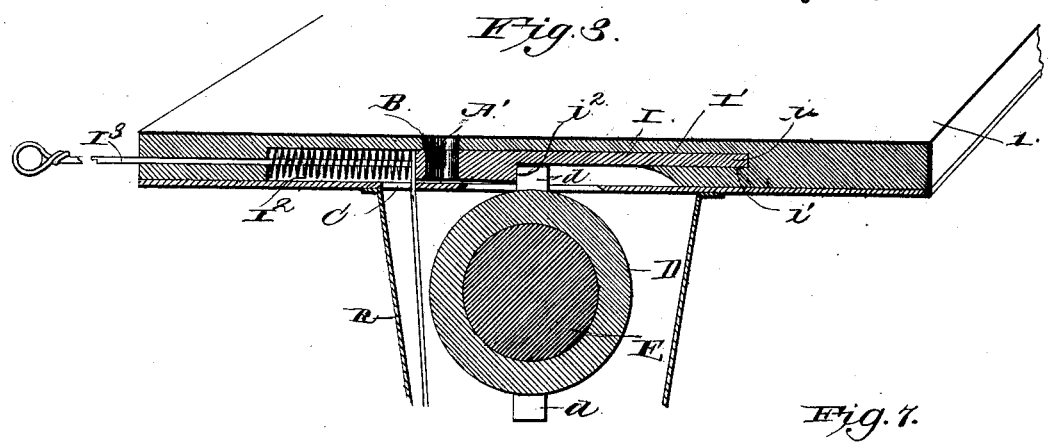
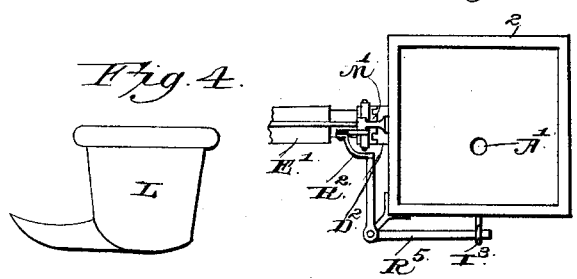
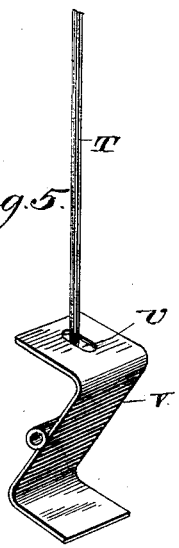
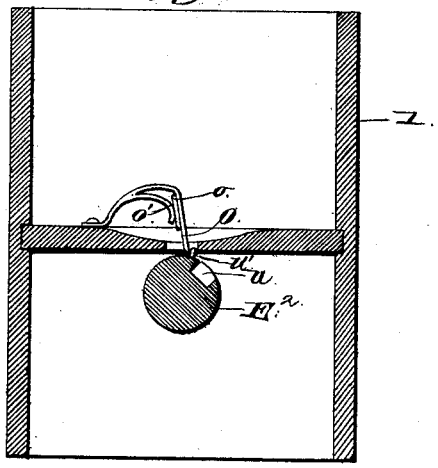
Witnesses
M. Fowler
E. G. Siggers
Inventor
James C. Lloyd
By his Attorneys

UNITED STATES PATENT OFFICE.

JAMES CHOLWELL LLOYD, OF CHICAGO, ILLINOIS.

PLANTER.

SPECIFICATION forming part of Letters Patent No. 407,021, dated July 16, 1889.

Application filed August 9, 1888. Serial No. 282,314. (No model.)

*To all whom it may concern:*

Be it known that I, JAMES CHOLWELL LLOYD, a citizen of the United States, residing at Chicago, in the county of Cook and State of Illinois, have invented new and useful Improvements in Planters, of which the following is a specification.

This invention relates to planters which are designed to plant two or more different kinds of seed, as pumpkin-seed and corn, at the same time, but at different distances apart. For instance, the corn will be planted at three feet apart, (more or less,) and the pumpkin-seed at ten feet apart, (more or less.) The machine is mounted on wheels, and motion is communicated from the axle to the operating parts through suitable instrumentalities, which hereinafter will be more particularly described. The machine can be thrown in and out of gear, the openings in the seed-boxes closed, and the shoes raised from the ground at one and the same operation of a hand lever or levers, as will presently be more fully set forth.

Figure 1:
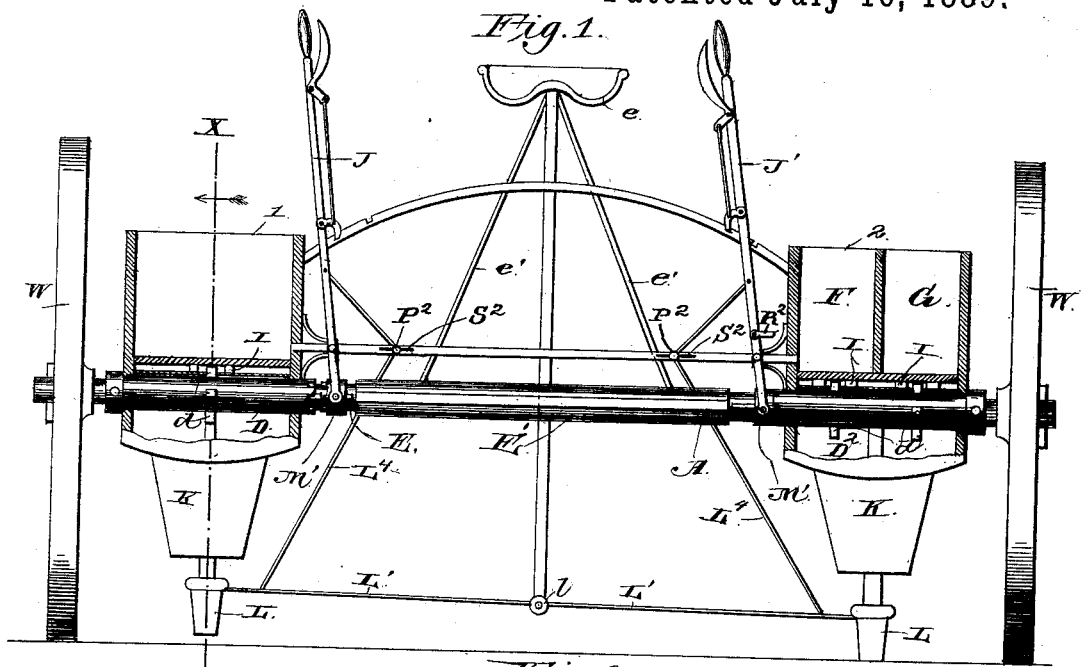
Figure 2:
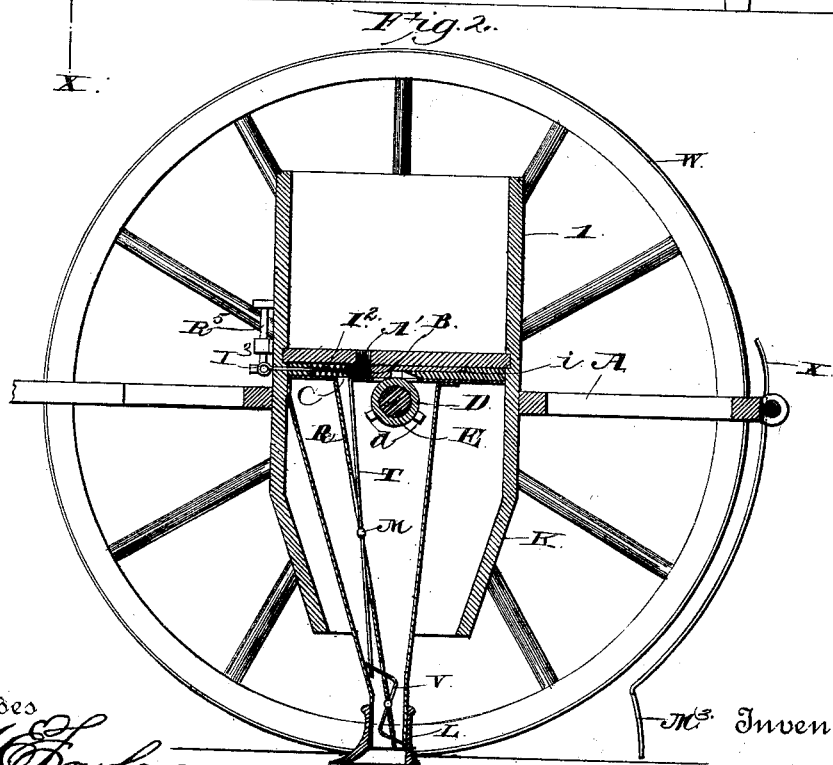

In the drawings, Figure 1 is a front view, parts being broken away, of a planter of my invention. Fig. 2 is a vertical section on the line $x\,x$ of Fig. 1, looking to the left. Fig. 3 is a vertical sectional view of the bottom portion of a hopper, showing the relative position of the axle and the tappet-sleeve on the axle. Fig. 4 is a detail side view of a shoe. Fig. 5 is a perspective view of the valve. Fig. 6 is a modification. Fig. 7 is a detail top view of one of the seed-boxes or hoppers, showing the bell-cranks and connecting-rods for throwing the seed-slides in a forward direction.

The planter-frame A, a light structure, is mounted on the axle E, which is provided with the drive-wheels W W on its ends. The frame is secured to the sleeve E', which is mounted on or rather forms a bearing for the middle portion of the said axle. The seat $e$ for the driver, mounted on a vertical standard of the frame, is braced laterally by the stays $e'$. The seed-boxes 1 and 2 are arranged one at each side of the frame and have the axle E passing through them, the bottom of the seed-boxes being placed above the axle. Each seed-box may be constructed alike; but it is preferred to have them differ, the box 1 having only one compartment, while the box 2 is divided to form two vertical compartments F and G. In all other respects the seed-boxes and the seed-slide-operating devices will be constructed in a similar manner. Hence a detailed description of one will suffice for all. The bottom of the hopper has an opening A' in its top portion and an opening C in its under portion, the two openings being out of line, the one in advance of the other. The seed-slide I is located in a pocket I' in the bottom of the hopper, and is provided with an opening B, which is adapted to register with the openings A' and C. The rear end of the seed-slide is reduced to form the guide-extension $i$, which works in a reduced portion of the pocket $i'$ and guides the slide in its movements. The spring $I^2$, arranged in the pocket I' and bearing on the seed-slide, holds the said seed-slide in a normal position, and returns it to said position when carried forward by the tappet $d$ and released from the said tappet. There may be as many of these tappets $d$ as desired, which tappets are provided on the sleeve D, that passes through the seed-box and is mounted loosely on the shaft E. The tappets $d$ work through an opening in the bottom, and are adapted to engage with the seed-slide and carry it forward, the point of engagement of the tappets with the said seed-slide being at $i^2$, which is a shoulder or offset formed between the seed-slide and its guide-extension $i$. The rod $I^3$, connected with the seed-slide and extending beyond the seed-box, may have its outer end connected by suitably-arranged bell-crank levers $R^5$ and connecting-rods $R^2$ with one or the other of the hand-levers J J', as shown clearly in Fig. 7 of the drawings. The sleeve D has a single set of tappets, while the sleeve $D^2$, which passes through the seed-box 2, is provided with two sets of tappets, one for each compartment G and F. There will be more tappets for the compartment G than for the compartment F. Consequently the seed-slide in the compartment F will be operated a less number of times than the seed-slide in the compartment G, as will be readily comprehended. The grain-spout K, one being provided for each seed-box, is secured to the bottom of the seed-box and is divided vertically by the partition R, which is arranged to have its upper end come in front of the openings A', B, and C. The flirt-valve V is pivoted midway of its ends to the partition R, and has its ends, which curve in opposite directions, passing through slots in the said partition above and below the axis of the said flirt-valve. The upper end of the flirt-valve is provided with a slot or opening $v$, through which the lower end of the lever T, pivoted at M to the partition, extends. The upper end of the lever T engages with and is operated by the seed-slide I.

The shoes L are supported on the ends of the rods L', which are pivoted at $l$. The elbow-levers $L^4$, which are mounted pivotally upon pins $P^2$, sliding in slots $S^2$ in the frame, have their lower branches connected with the rods L' and their upper branches connected with the levers J J' in such a manner that when the levers J J' are thrown out the said rods L' will be lifted and elevate the shoes L.

The clutch-sleeves M', mounted on the axle and adapted to rotate with and capable of having a longitudinal movement on the said axle, are constructed to engage with the ends of the sleeves D and D' and effect a rotary movement of the said sleeves. The clutch-sleeves M are connected with and operated by the levers J J'.

The wheels W W are kept clean by the scraper X, which is located in the rear of the machine, and is supported by the frame A.

The corn coverer or scraper $M^3$ is combined with the cleaner X, and may be subject to leverage-power when necessary, and, if desired, may be connected with the levers J J' to be raised and lowered by them at the same time the machine is thrown in and out of gear.

In some cases the sleeves D D' will be dispensed with and the tappets will be inserted in the axle.

In Fig. 6 is shown a modification in which the axle $E^2$ has a pocket $u$ and a tappet $u'$, arranged directly in front of the pocket. This tappet is adapted to strike a spring-arm O in the bottom of the seed-box, on which the plate $o$ is mounted. The spring-arm O is re-enforced by a second spring-arm O'. This arrangement is used for drilling or continuous planting in straight rows. The plate $o$ and the arms O and O' serve as agitators to prevent clogging of the seed.

The operation of the machine will be readily understood from the foregoing description.

Having described my invention, I claim—

1. In a seed-planter, the combination of the frame, the seed-boxes, the longitudinally-reciprocating seed-slides actuated by tappet-sleeves mounted upon the axle, clutches feathered upon the axle and adapted to engage said tappet-wheels, hand-levers pivoted to the frame and connected with said clutches, rods and bell-crank levers connecting said hand-levers with rods extending forwardly from the seed-slides, seed-tubes extending downwardly from the hoppers, shoes mounted upon levers pivoted to the frame, and bell-cranks connecting said levers with the hand-levers, whereby by a single operation of the latter the shoes shall be raised, the clutches uncoupled from the tappet-sleeves, and the seed-slides drawn forward, so as to cover the seed-openings, or vice versa, thus throwing the machine into or out of gear, substantially as set forth.

2. The combination of the seed-spouts, the shoes L, supported upon pivoted rods L', the elbow-levers $L^4$, mounted pivotally upon pins $P^2$, sliding in slots $S^2$ in the frame and having their lower arms connected to the rods L', and the hand-levers connected with the upper arms of the elbow-levers $L^4$ and adapted to operate the latter, substantially as set forth.

3. In a planter, the combination, with the grain-spout and the partition R, dividing the grain-spout, of the flirt-valve V, pivoted midway of its ends to the said partition and having its ends curving in opposite directions and passing through slots in the partition, and the lever T, having its lower end connected with the flirt-valve and adapted to have its upper end connected with the seed-slide, substantially as described.

In testimony that I claim the foregoing as my own I have hereto affixed my signature in presence of two witnesses.

JAMES CHOLWELL LLOYD.

Witnesses:
WILLIAM T. RAYCROFT,
PAUL BROWN.